Aug. 17, 1965
M. W. THRING
3,201,622
GENERATION OF ELECTRICITY
Filed Feb. 29, 1960
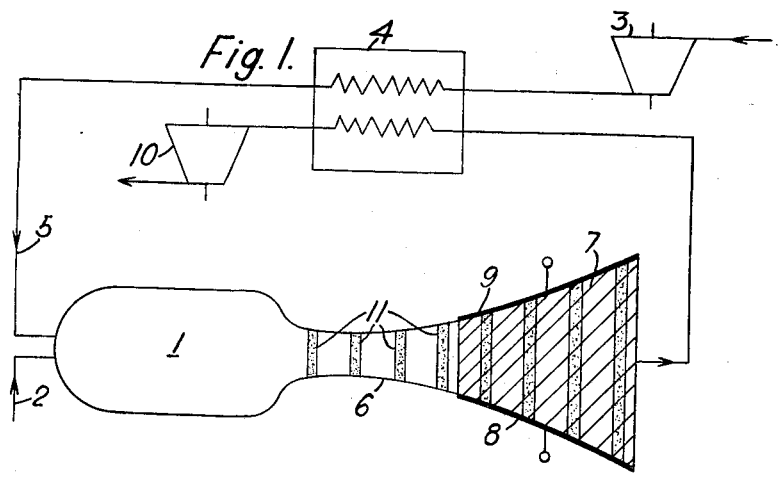
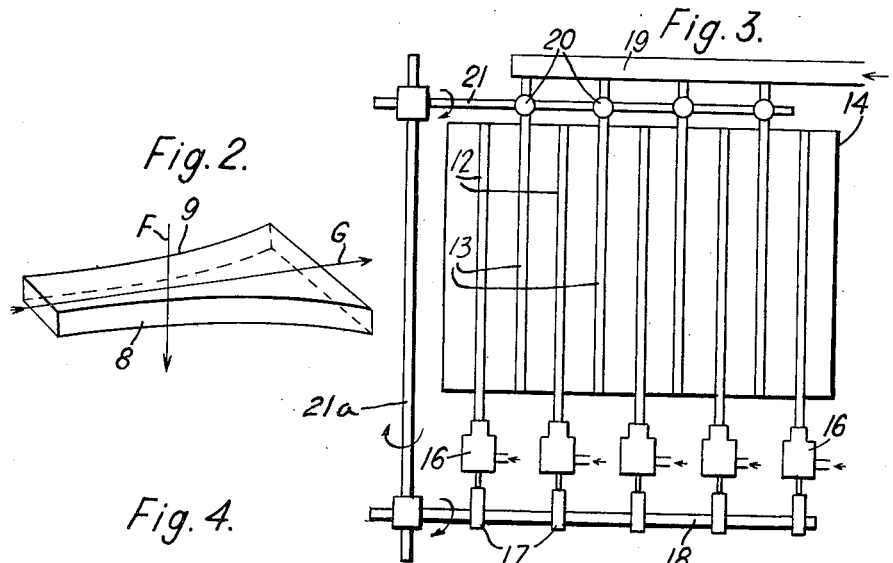
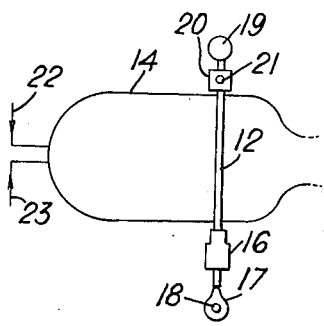
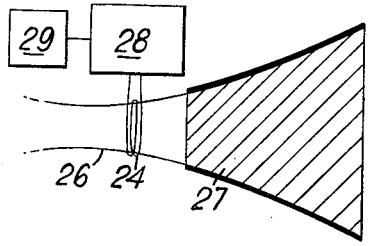
Inventor
MEREDITH WOOLDRIDGE THRING
By
Larson and Taylor
Attorney United States Patent Office 3,201,622
Patented Aug. 17, 1965

3,201,622
GENERATION OF ELECTRICITY
Meredith Wooldridge Thring, Sheffield, England, assignor to National Research Development Corporation, London, England
Filed Feb. 29, 1960, Ser. No. 11,657
Claims priority, application Great Britain, Mar. 3, 1959, 7,425/59
15 Claims. (Cl. 310—11)

This invention relates to a method of generating electricity in which a conductive gas is passed at high temperature and high velocity through a magnetic field wherein the kinetic energy of the gas is directly converted into electricity.

In such arrangement, if gases produced by the direct combustion of fuel in air are used as the working medium it is difficult to obtain the required conductivity since owing to the presence of water vapour and carbon dioxide in the gases it is difficult to maintain a number of ions considerably in excess of that corresponding to thermal equilibrium. This difficulty could theoretically be avoided by arranging that the gases in the magnetic field are at such high temperature that if they contain, for example, a small quantity of sodium, there will be sufficient free electrons present under thermal equilibrium to give the required gas conductivity which is, for example, of the order of 1 ohm-cm. However, in such case, and assuming an adiabatic expansion of the gases from the combustion chamber to the magnetic field over a pressure range of between 20:1 and 100:1, if the temperature of the gases in the magnetic field is to be of the required order of 2,000° C. the temperature in the combustion chamber will have to be of the order of 3,000° C. which is impracticable. An isothermal expansion over the same pressure range which may be obtained by allowing the combustion to continue during the expansion process will enable the gas temperature in the magnetic field to be raised without involving too high a temperature in the combustion chamber but such a cycle will not give nearly such a good thermodynamic efficiency as will an adiabatic cycle.

It is an object of the present invention to provide an improved method of operation which avoids these difficulties and which also ensures that the thermodynamic energy required for heating the gases will not be an excessive fraction of the cycle energy.

In the improved method of this invention, only a fraction of the total volume of gases passed through the magnetic field is heated to the tempertaure required to give the desired conductivity and this superheated portion is arranged, at least during the passage of the gases through the magnetic field, as a series of thin layers extending normal to the direction of the flow.

The gases passing through the magnetic field are preferably loaded with a small percentage of a readily ionisable compound such as a sodium or potassium salt and in one form of this invention such loading may be effected only as regards the superheated part of the total volume of gases.

These thin superheated layers of gas will act as conductors which are insulated from one another by the intervening layers of cooler gas but will enable the generation of electricity to absorb all the kinetic energy of the gas stream since when the superheated layers are slowed down in their passage through the magnetic field, the cooler and lower conductivity gases between them must also be slowed down. Since the time taken for the whole gas stream to move through the magnetic field will be of the order of a millisecond, there will not be sufficient time for any appreciable mixing of the gas layers and the thin superheated layers will consequently continue to operate as good conductors during their passage through the magnetic field. Subsequently these superheated layers are allowed to mix with the main body of gas and the temperature of the final mixture will not be much greater than that of the low temperature part of the stream, for example about 1,000° C. This temperature is low enough to allow the gas stream to be passed through the hot side of a metallic heat exchanger in which combustion air to be supplied to the combustion chamber may be preheated.

In order that the invention may be clearly understood some forms thereof will now be described with reference to the accompanying drawings, in which:

FIGURE 1 is a diagrammatic representation of a system in accordance with the invention;

FIGURE 2 is a perspective view showing the shape of the passageway for the gas through the magnetic field;

FIGURES 3 and 4 are diagrammatic views showing respectively an end view and a side view of one arrangement for producing thin superheated layers of gas, and FIGURE 5 is a diagrammatic view illustrating another method of producing thin superheated layers of gas.

Referring firstly to FIGURE 1, the system there shown comprises a combustion chamber 1 in which liquid fuel supplied by conduit 2 is burnt in the presence of air. The combustion air is drawn in from the atmosphere and compressed by compressor 3, heated in a heat exchanger 4 and delivered to the combustion chamber by conduit 5. The combustion gases from chamber 1 are expanded to high velocity in a convergent/divergent nozzle 6 and are passed through a magnetic field indicated by the hatched area 7, the direction of the field being normal to the plane of the drawing.

In one form the shape of the passageway for the combustion gas through the magnetic field may be as shown in FIGURE 2, the upper and lower boundaries of the passageway being defined by uniformly spaced pole pieces of a magnetic system and the side boundaries being defined by electrodes 8 and 9 which extend between the edges of the pole pieces and which in operation are connected with an external load. In FIGURE 2 the arrow F shows the direction of the magnetic field and the arrow G the direction of the gas flow.

Since the voltage drop between the electrodes 8 and 9 at any point along the length of the passageway is proportional to the product of their separation and the gas velocity, it is convenient to keep this voltage drop constant by increasing the separation of the electrodes towards the outlet end since this allows the passageway to form a continuation of the convergent/divergent nozzle.

The combustion gases from the outlet end of the magnetic field are passed through the heat exchanger 4 and discharged to atmosphere, being re-compressed to atmospheric pressure if necessary by a compressor 10.

In such an arrangement the conductivity of the gases in the magnetic field is dependent both on the temperature and on the pressure of the gases and it is difficult to achieve a satisfactory degree of conductivity unless the gas temperature in the combustion chamber is raised to an impracticable level. This difficulty is overcome by the method of this invention since the bulk of the gas passing through the magnetic field need not be raised to a temperature at which it is sufficiently conductive and only a small fraction of the gas has to be heated to such a temperature as to provide the desired conductivity. This enables difficulty in the construction of the plant to be avoided not only as regards the combustion chamber 1 and nozzle 6 but also as regards the heat exchanger 4 since the average temperature of the gases leaving the magnetic field may be arranged to be sufficiently low to enable a metallic heat exchanger to be used. It is, however, important to ensure that the superheated portion of the gas stream is arranged as a series of relatively thin layers which extend normal to the direction of flow and which in effect divide the bulk of the relatively cooler gas travelling through the magnetic field into a series of slugs as is illustrated very diagrammatically in FIGURE 1 wherein the shaded areas 11 indicate the superheated gas layers. Owing to the short time taken by a superheated layer to pass through the magnetic field, there is no appreciable mixing of the gases and these layers therefore operate as good electrical conductors for this interval of time. In consequence, the kinetic energy of the whole gas stream is absorbed by the generation of electricity since the slowing down in the magnetic field of the superheated layers 11 necessarily causes the intervening cooler gases of lower conductivity to be slowed down as well.

In the operation of the system shown in FIGURE 1, atmospheric air may be compressed in compressor 3 to a pressure of between five and ten atmospheres, heated in the heat exchanger 4 to a temperature of 800° C. and delivered to the combustion chamber 1 where it is burnt with liquid fuel, such as oil, to provide combustion gases at a temperature of the order of 2,000° C. These gases, separated by the higher temperature gas layers 11, the volume of the higher temperature gases being of the order of one-twentieth of the total volume, are passed through the convergent/divergent nozzle 6 and through the magnetic field 7, and at their exit from this field may be at a temperature of 1,000° C. and a pressure of, say, one-tenth of an atmosphere. If they are removed from the magnetic field when their velocity is, say, one-quarter of that at the start, the remaining kinetic energy may be re-converted to pressure in a diffuser. The gases are then passed through the heat exchanger 4 and may be water-cooled to atmospheric temperature if necessary or used to raise steam. They are then compressed back to atmospheric pressure in an electrically driven compressor 10 and exhausted to atmosphere.

Clearly the pole pieces of the magnetic system will have to be thermally insulated in view of the temperatures involved and any convenient known technique may be employed for this purpose. For example, the pole faces may be provided with a layer of thermally insulating material. In addition, the pole pieces may be cooled, for example, by circulating water through passages formed in the pole pieces just behind the thermal insulation. By these means the material of which the pole pieces are formed may be kept at a temperature well below the Curie temperatures for the material so as to maintain a high permeability.

The electrodes 8 and 9 are of a material capable of withstanding the high temperatures involved. For example, they may be formed of a metal such as tungsten or molybdenum, or alternatively of a glass of the type which becomes a good electrical conductor at about 1500° C. without becoming liquid.

Various methods may be employed for obtaining the desired layers of the superheated gases. For example in the case where fuel is burnt with air in a combustion chamber and the combustion gases are expanded through a convergent/divergent nozzle to pass through the magnetic field, there may be arranged in the combustion chamber at a point where the main combustion gases are fully burnt and just upstream of the convergent part of the nozzle, a double grid of tubes extending across the combustion chamber and through apertures in which small pulses of oxygen and liquid fuel respectively are ejected.

If for example, it is intended that only one-twentieth of the total volume of the combustion gases shall be superheated, these pulses of oxygen and liquid fuel may be timed so as to occupy one-twentieth of the total time. The arrangement would preferably be such that the oxygen and liquid fuel have just completed combustion about half way down the nozzle, or towards the end of the nozzle, so that they are in effect expanded partly adiabatically and partly isothermally from a temperature of about 3,000° C. to finish up in the magnetic field at a temperature of about 2,500° C. The 3,000° C. temperature will, however, never be reached since adiabatic cooling takes place at the same time as combustion heating.

One such arrangement is illustrated in FIGURES 3 and 4 in which there is shown a grid of tubes 12 and 13 extending across the combustion chamber 14 just upstream of the entrance of the converging portion of a convergent/divergent nozzle 15. The tubes 12 are perforated or are formed with nozzles at intervals along their length and supply liquid fuel to the combustion chamber. Likewise the tubes 13 are perforated or are formed with nozzles at intervals along their length and supply oxygen to the combustion chamber. In order that the combustion of the liquid fuel and oxygen produces the desired thin layers of superheated gases, the supply of fuel and oxygen to the tubes 12 and 13 is timed so as to occur during an interval which is a relatively small fraction of the interval between each occurrence. To this end the fuel is supplied to the tubes 12 by means of fuel injector type valves 16 which are operated by means of cams 17 arranged on a common cam shaft 18 while the oxygen supplied under pressure through pipe 19 is admitted to the tubes 13 through valves 20 which are controlled by a rotary shaft 21. The shafts 18 and 21 are driven in synchronism from a common driving means, not shown.

Air and liquid fuel are supplied to the combustion chamber 14 through conduits 22 and 23 (FIGURE 4) respectively. In this form of the invention the provision of a small percentage of a readily ionisable compound to the combustion gases is readily effected by introducing such compound with the oxygen supplied through pipe 19 and tubes 13 or even with the liquid fuel supplied through tubes 12.

Alternatively, the desired layering of the combustion gases in the magnetic field may be obtained by using a burst of release of electrical or nuclear energy either at the inlet or at the outlet of the nozzle. For example, periodic high frequency discharges may be arranged to take place across the whole gas stream by means of a coil or coils positioned round the high velocity end of the nozzle. Such discharges would occur for only one-twentieth of the total time so that the free electrons would appear in thin layers in the gas stream. One suitable arrangement for this purpose is illustrated diagrammatically in FIGURE 5 which shows a coil 24 arranged round the divergent part of a convergent/divergent nozzle 26 just upstream of the magnetic field indicated by hatched area 27. The coil 24 is supplied with pulses of high frequency energy from pulse generator 28. The pulses supplied to coil 24 are conveniently timed by a suitable control device 29 so that their duration is relatively short compared with the interval between them. The coil 24 should of course be protected by a layer of suitable thermally insulating material between the coil and the outside of the nozzle 26, and the coil itself may be water-cooled. The construction and arrangement of the control device 29 and the pulse generator 28 will be familiar to electronic engineers and need not be described herein.

I claim:

1. The method of generating electricity comprising passing a stream of a conductive gas continuously and at high velocity through a magnetic field which includes forming in said stream a series of thin layers of higher conductivity gas, said layers extending normal to the direction of flow of said stream.

2. The method of generating electricity comprising passing a stream of a heated gas continuously and at high velocity through a magnetic field which includes subdividing said stream by forming therein a series of thin layers extending normal to the direction of flow, the gas in said layers being at a higher temperature than the remainder of the gas.

3. The method of generating electricity comprising passing a stream of gas at high temperature and high velocity continuously through a magnetic field which includes periodically forming in said stream a layer of superheated gas, said layer extending normal to the direction of flow of said stream.

4. The method of generating electricity comprising passing a stream of gas at high velocity through a magnetic field which includes periodically forming in said stream a layer of conductive gas, said layer extending normal to the direction of flow of said stream.

5. The method of generating electricity comprising passing a stream of gas continuously and at high velocity through a magnetic field in which only a fraction of the total volume of gas passing through the magnetic field is heated to the temperature necessary to give the required conductivity, and this portion is arranged as a series of thin layers having their major surfaces extending substantially normal to the direction of flow of the stream.

6. Apparatus for generating electricity comprising means for producing a heated gas and for passing it in a continuous stream at high velocity through a magnetic field, and means for creating in said stream a succession of thin layers of superheated gas, said layers extending normal to the direction of flow of said stream.

7. Apparatus for generating electricity comprising means for producing heated combustion gases, means for passing said gases in a continuous stream at high velocity through a magnetic field, and means for creating in said stream a series of spaced and relatively thin layers of superheated gases.

8. Apparatus for generating electricity comprising means for burning fuel to produce heated combustion gases, means for passing said gases at high velocity in a continuous stream through a magnetic field, and means for periodically injecting additional fuel into said stream such that the combustion of said additional fuel produces a layer of super-heated gas having its surfaces extending normal to the direction of flow of said stream.

9. Apparatus for generating electricity including means for producing heated gases, means for creating a magnetic field, means for passing a stream of said gases continuously and at high velocity through said magnetic field, and means for periodically creating in said stream a layer of superheated gases extending normal to the direction of flow of said stream.

10. Apparatus for generating electricity comprising a combustion chamber, means for burning fuel in air under pressure in said chamber, a convergent-divergent nozzle forming an exit for combustion gases from said chamber, means including a pair of facing pole pieces for creating a magnetic field, electrode means extending between said pole pieces and defining therewith a passageway forming a continuation of the divergent portion of said nozzle, and means upstream of said passageway for periodically creating in said combustion gases a layer of superheated combustion gases which extends across said nozzle.

11. Apparatus as set forth in claim 10, including means upstream of said passageway for injecting into the gas stream pulses of liquid fuel and oxygen.

12. Apparatus as set forth in claim 10, including a grid of tubes arranged across said combustion chamber adjacent the exit therefrom, said tubes being formed with nozzles at spaced points along their length, and means for periodically ejecting through said nozzles pulses of oxygen and liquid fuel.

13. Apparatus for generating electricity comprising a combustion chamber, means for burning fuel in air under pressure in said chamber, a convergent-divergent nozzle forming an exit for combustion gases from said chamber, means including a pair of uniformly spaced facing pole pieces for creating a magnetic field, electrode means extending between said pole pieces and defining therewith a passageway for combustion gases from said nozzle, the separation of said electrode means at any point in said passageway being such that the product of the separation and the gas velocity at such point is a constant.

14. Apparatus for generating electricity comprising means for producing a supply of heated gas under pressure, a convergent-divergent nozzle for expanding said gas to produce a high velocity stream, means for producing a magnetic field, said means including a pair of pole pieces between which said stream is passed, and electrical means for producing periodically in said stream a thin layer of superheated gas, said layer extending normal to the direction of said stream.

15. Apparatus as set forth in claim 14 including a coil embracing said nozzle and means for supplying said coil with pulses of high frequency electrical energy.

References Cited by the Examiner

UNITED STATES PATENTS 1,916,076  6/33  Rupp _____ 310—4

FOREIGN PATENTS 738,511  1/55  Great Britain.
1,161,079  3/58  France.

MILTON O. HIRSHFIELD, *Primary Examiner.*

ORIS L. RADER, *Examiner.*